J. H. BECKMAN.
AUTOMOBILE TURNING DEVICE.
APPLICATION FILED AUG. 27, 1917.

1,266,094.

Patented May 14, 1918.
3 SHEETS—SHEET 1.

Inventor
Jacob H. Beckman
By Henry L. Reynolds
Attorney

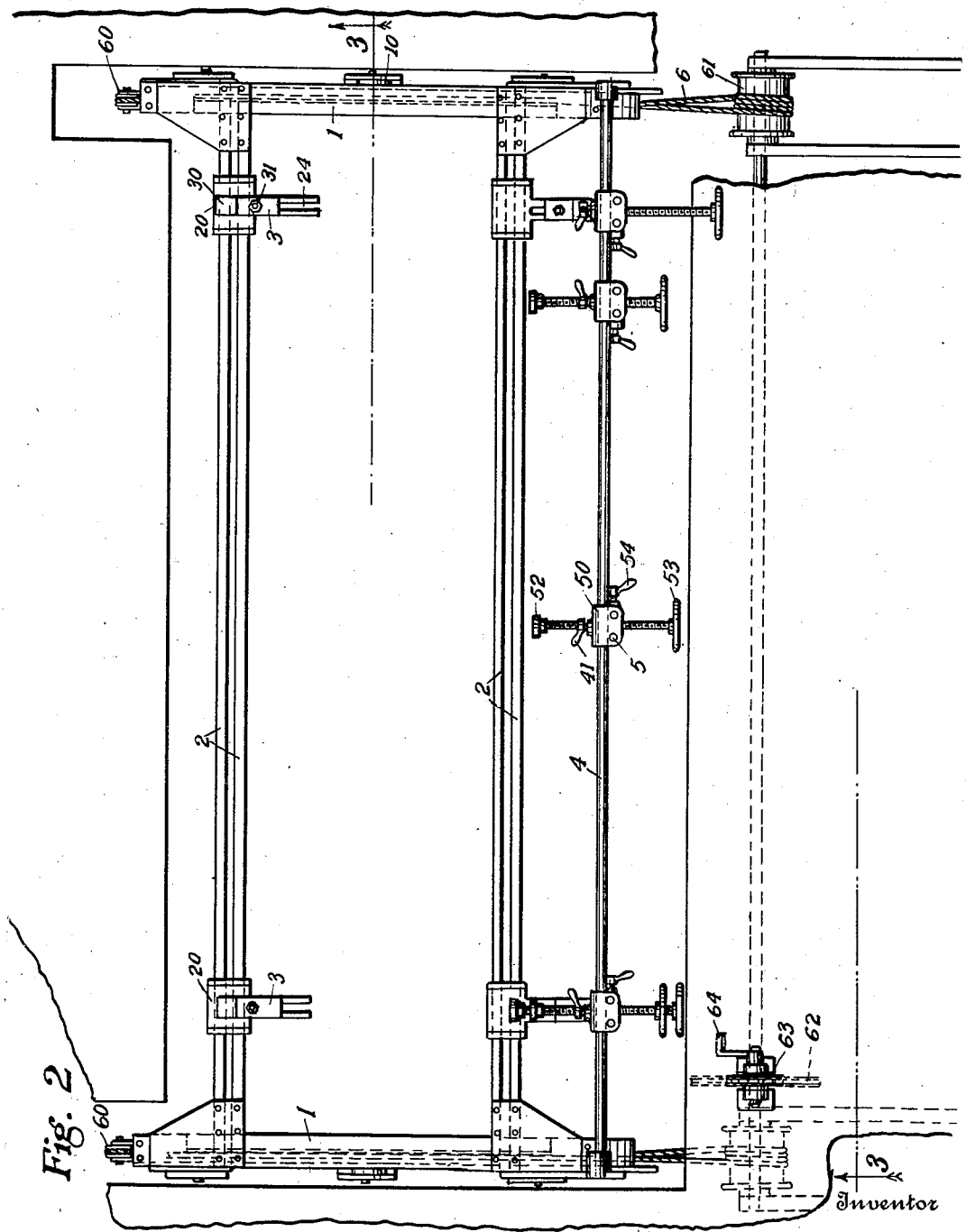

J. H. BECKMAN.
AUTOMOBILE TURNING DEVICE.
APPLICATION FILED AUG. 27, 1917.
1,266,094.
Patented May 14, 1918.
3 SHEETS—SHEET 3.
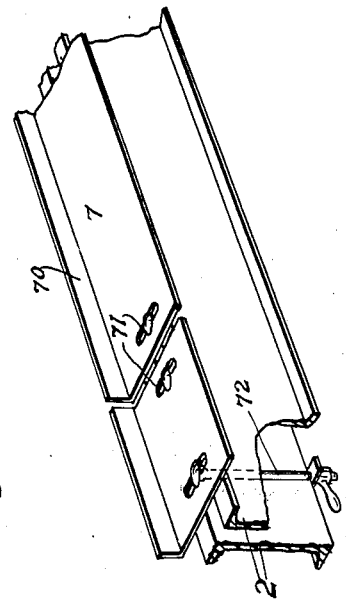
Fig. 5
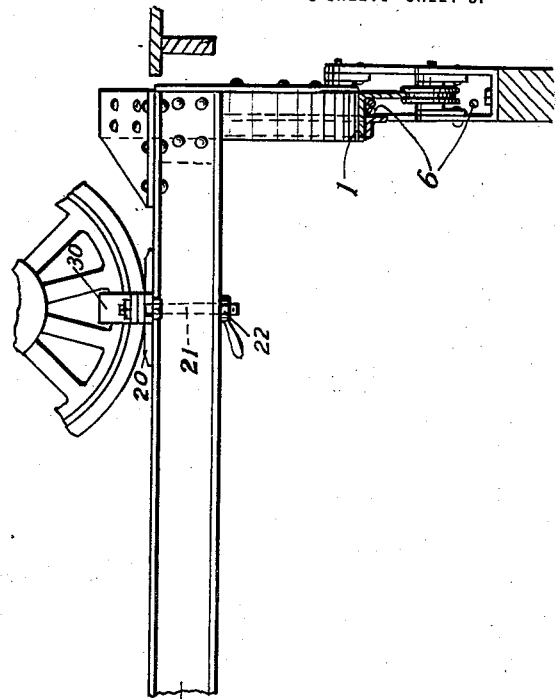
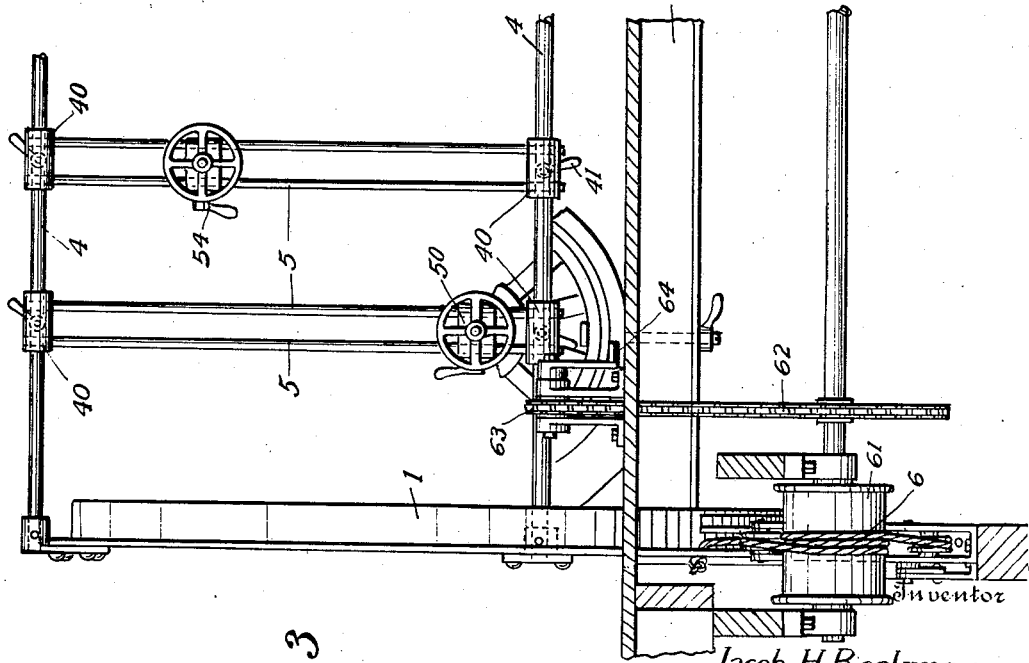
Fig. 3
Inventor
Jacob H. Beckman
By Henry L. Reynolds
Attorney

UNITED STATES PATENT OFFICE.

JACOB H. BECKMAN, OF SEATTLE, WASHINGTON.

AUTOMOBILE-TURNING DEVICE.

1,266,094.      Specification of Letters Patent.      Patented May 14, 1918.

Application filed August 27, 1917. Serial No. 188,526.

*To all whom it may concern:*

Be it known that I, JACOB H. BECKMAN, a citizen of the United States, and resident of the city of Seattle, county of King, and State of Washington, have invented certain new and useful Improvements in Automobile-Turning Devices, of which the following is a specification.

My invention relates to devices for turning automobiles to thereby make more accessible the power plant and the parts under the body, and comprises certain novel parts and combinations of parts which will be herein described and then particularly claimed.

The object of my invention is to place the automobile or auto-truck in such position that it may be easier to get at the mechanism thereof to repair or adjust the same. This is done by turning the automobile or truck upon its side, or so that the axles thereof occupy substantially a vertical position.

In the accompanying drawings I have shown my device in the form of construction which is now preferred by me.

Fig. 2 is a plan view of the device in its normal position or that wherein the automobile, when placed thereon, would be horizontal.

Fig. 3 is a side elevation with parts in section to better show their construction.

Fig. 5 is a perspective of a short section of a wheel trackway showing thereon plates used to widen the same.

Figure 1:
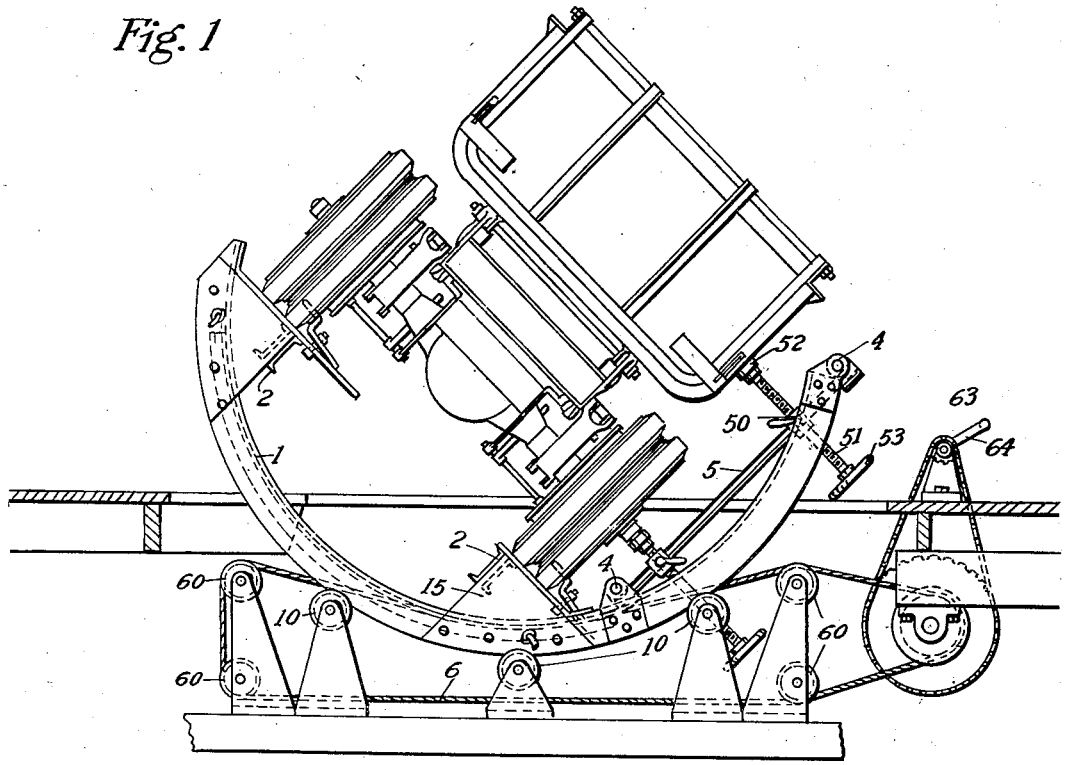
Figure 1 is an end view of the device showing an auto-truck partly turned toward the vertical position.

In my device I employ a frame which is adapted to receive the automobile and to plant the same in place, and which may be turned about a fixed horizontal axis so as to turn the automobile into any position desired between the horizontal and vertical position of the axis.

In the present device this frame employs two arcuate beams, 1, these beams extending through an arc of approximately 180°, and extending beneath and opposite to one side of the automobile and transversely thereof. These beams 1 are herein shown as formed from angle bars in which the horizontal flange is uppermost and as having the lower edge of the vertical flange bearing upon grooved wheels 10, of which three are shown as employed for each beam. The number of these might be increased if thought desirable.

These arcuate beams are placed at opposite ends of the frame. They are connected by suitable horizontal beams so as to bind the two together and to secure synchronous action between them. For those beams which form the wheel trackways I prefer to employ channel bars 2, these being employed in pairs and so located as to fit the wheel gage of the automobile.

If a wider trackway surface is desired this may be secured by using supplemental plates 7 which may, if desired, have an upstanding flange or flanges, as 70, and are removably secured, as by bolts 72 which pass through slots 71, whereby the plates may be adjusted sidewise of the beams 2. These plates 7 may be furnished of assorted lengths to fit differing wheel bases.

Figure 4:
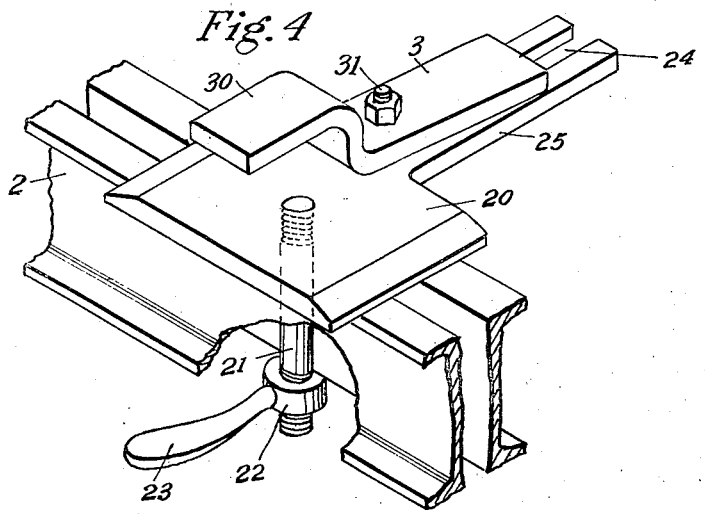
Fig. 4 is a perspective showing in detail the construction of the wheel-supporting plates and the manner of adjusting and securing these upon the frame.

The beams of each pair are slightly separated, as is clearly shown in Figs. 2 and 4. They are also provided with wheel supporting plates 20, which are adjustable lengthwise of the beams to accommodate automobiles having different spacing between the front and rear wheels.

A preferable form of construction for this is shown in perspective in Fig. 4. The plate 2 is somewhat wider than the beams and need be only of sufficient length to form a sufficient bearing for the wheels. The plate is secured in position on the beams 2 by means of a bolt 21 which screws into the plate 20, and passes downward between the two beams 2, at its lower end, having a nut 22 secured thereon, which nut may be provided with a handle 23 for convenience of quick operation.

The wheel of the automobile is clamped in position upon the plate 20 in such manner that it is securely held down thereon and there is no chance of its becoming displaced when the automobile is turned on its side. The preferred means for doing this consists of employing a bar 3 which has an offset end 30 adapted to extend over the lower side of the wheel rim, as is clearly shown in Fig. 1. This is clamped down upon the wheel rim by means of a securing bolt 31 which passes through the bar 3 and through a slot 24, formed in a projecting arm 25 of the plate 20. This feature of construction permits adjustment of the securing bar 3 toward and from the center of the device and thus accommodates it to automobiles having different distances between opposite wheels. This clamping bar 3 thus serves to hold the wheel down upon the plate and also, by its offset portion, as a support for the weight of the wheel when the automobile is turned.

The portion of the arcuate bars 1, which extend up alongside of the automobile, are connected by horizontal bars 4. Two of these bars are shown, one well down on the bars 1 and the other at the upper end thereof. These form the basis of support for devices which are intended to engage the side of the automobile to assist in supporting the same when it is turned upon its edge.

The preferred form of construction for these devices is as follows. Blocks 40 are mounted to slide along the bars 4 and means are provided for securing them in place, such for instance, as clamping bolts and nuts similar to the bolt 2, by which the plate 20 is secured in place upon the trackway beams. These are shown clearly in Fig. 3 and are therein shown as provided with arms 41 extending outwardly from the nuts. These blocks 40 have secured thereto two vertical bars 5. These bars are spaced somewhat apart and have mounted thereon, so that it may be secured at any elevation, blocks 50. Each of these blocks has passing therethrough and engaging therewith by means of complemental threads, a rod 51, which at the outer end is preferably provided with an operating wheel 53, and at its inner end with a foot 52, adapted to engage with the side of the automobile, or some part thereof. The clamping of the blocks may be secured by a bolt and nut arrangement 54, similar to the like mechanism as shown in Fig. 4. By the use of the above construction the supporting members for the automobile may be adjusted in any position desired.

The means for communicating the turning movement for the frame thus described may be anything found suitable. Means herein shown consists of the following parts. A rope, cable, chain, or any other suitable equivalent flexible member, as 6, has its ends secured toward opposite ends of the arcuate beams 1. It passes about guide pulleys 60 and about a drum or gypsy head 61, which is located at any convenient point and operated through any suitable mechanism. The mechanism herein shown is only suggestive and consists of a large wheel 62, which is connected with the drum 61, and the smaller wheel 63, which is turned by means of a crank 64. In most cases a power connection with this would be employed. As there is nothing novel in this mechanism I do not think it necessary to describe it in detail.

By the use of the mechanism described, an automobile may be secured in place and then turned upon its side. It is also capable of holding the automobile at any angular position between these two. In consequence, the under part of the car is readily accessible for any repairs and adjustments.

What I claim as my invention is:

1. An automobile turning device comprising a frame for holding the automobile, said frame containing two arcuate beams and bars connecting the same, located beneath the wheel lines of the automobile, wheel bearing plates adjustable upon said bars to fit the spacing of the wheels of automobiles, stationary supporting wheels for said arcuate frame beams, and means for turning the frame upon said wheels.

2. In a device of the character described, separated wheel trackway members, each consisting of two separated beams, wheel bearing plates adjustable along said beams and securing bolts extending downward between said beams.

3. In a device of the character described, separated longitudinal beams adapted to serve as wheel trackway member for the automobile, a wheel bearing plate adjustable along said beams, a wheel securing plate having an offset end adapted to engage over the wheel rim, a clamping bolt securing the clamping plate to the wheel bearing plate, and means for securing the wheel bearing plate upon said beams.

Signed at Seattle, Washington, this 21st day of August, 1917.

JACOB H. BECKMAN.